June 9, 1931. L. A. HOERR 1,809,037
ANGLE COCK AND HOLDER THEREFOR
Filed July 2, 1928
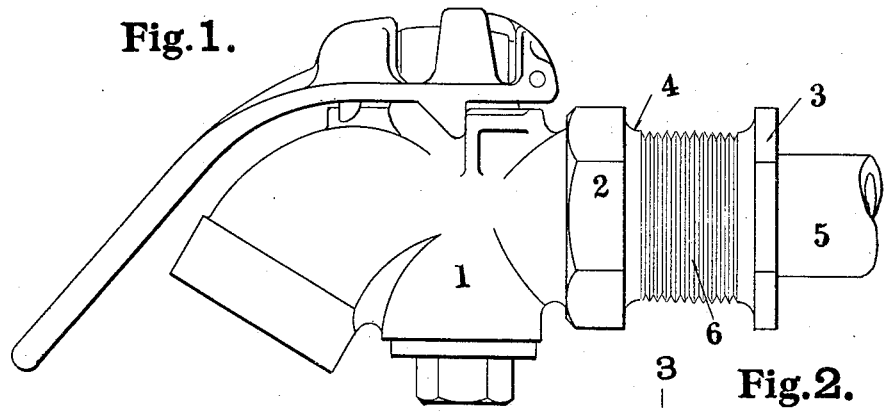
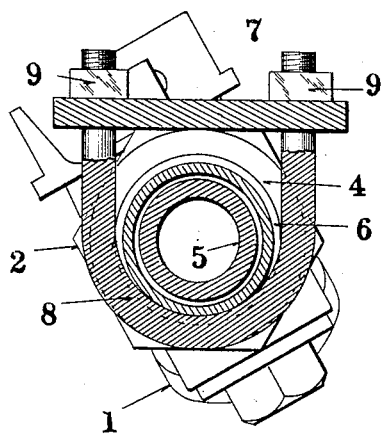
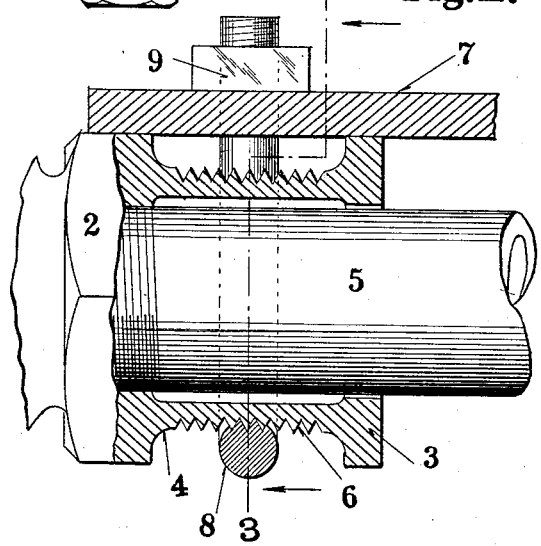
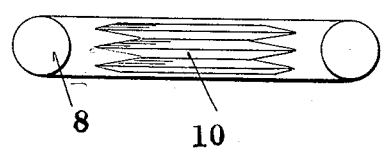
Inventor
L. A. Hoerr
By [signature]
Att'y.

Patented June 9, 1931

1,809,037

UNITED STATES PATENT OFFICE

LOUIS A. HOERR, OF ST. LOUIS, MISSOURI, ASSIGNOR TO RAILWAY DEVICES COMPANY, OF ST. LOUIS, MISSOURI, A CORPORATION OF MISSOURI

ANGLE COCK AND HOLDER THEREFOR

Application filed July 2, 1928. Serial No. 289,672.

The object of my invention is to provide an angle cock which may be engaged by a holder of simple construction, preferably a U-bolt and cooperating plate, and firmly held against longitudinal movement while at the same time permitting of limited longitudinal adjustment relative to the holder when the device is placed in position on the car.

In the accompanying drawings, which illustrate one form of angle cock and holder made in accordance with my invention, Figure 1 is a side elevation of the angle cock; Figure 2 is an enlarged view partly in section of the head of the angle cock and the holder; Figure 3 is a section taken on the line 3—3 of Figure 2; and Figure 4 is a top plan view of the U-bolt forming part of the holder.

The body 1 of the angle cock is of the usual form but the head is elongated, consisting of two hexagonal parts 2 and 3, respectively, separated by a cylindrical part 4. Formed in the interior of the head are threads to receive corresponding threads on the train pipe 5, and on the exterior of the cylindrical portion of the head are formed annular grooves 6. These grooves are preferably of a form similar to an ordinary V-thread, in fact a thread may be used in lieu of the grooves.

The holder consists of the usual supporting plate 7 secured to the car in any suitable manner (not shown) and a U-bolt 8. One face of each of the hexagonal parts 2 and 3 bears against the supporting plate and said faces are firmly held against the U-bolt passing around the cylindrical part of the head with its ends projecting through holes in the supporting plate and engaged by the nuts 9.

Formed on the inner face of the bend of the U-bolt are teeth 10 corresponding in shape to the grooves 6 with which they engage to positively prevent any longitudinal movement of the angle cock relative to the holder after the parts are in position. It will be evident, however, that in assembling the parts a longitudinal adjustment of the angle cock may be obtained equal to the distance between the hexagonal parts 2 and 3 less the diameter of the U-bolt.

Having fully described my invention, what I claim as new and desire to secure by Letters Patent of the United States is:

In a device of the class described, the combination with a supporting plate, of an angle cock provided with an integral head having a pair of bearing faces for the plate and an intermediate clamping portion, and a U-bolt cooperating with said clamping portion to retain the angle cock in position, said clamping portion being provided with circumferentially extending corrugations, said U-bolt being provided on its concave face with corresponding corrugations cooperating with the first named corrugations.

In testimony whereof, I hereunto affix my signature, this 30th day of June, 1928.

LOUIS A. HOERR.